United States Patent [19]
McCalister

[11] 4,219,966
[45] Sep. 2, 1980

[54] METHOD OF RAPID GRASS GROWTH

[76] Inventor: William J. McCalister, 646 Meadowood Dr., Broken Arrow, Okla. 74012

[21] Appl. No.: 22,525

[22] Filed: Mar. 21, 1979

[51] Int. Cl.² ............................................. A01G 7/00
[52] U.S. Cl. ............................................. 47/9; 111/1; 111/DIG. 1; 47/57.6
[58] Field of Search ................... 47/9, 58, 57.6, 56; 111/1, DIG. 1

[56] References Cited
U.S. PATENT DOCUMENTS

| | | | |
|---|---|---|---|
| 1,962,806 | 6/1934 | Clapp | 47/9 |
| 3,017,720 | 1/1962 | Busch | 47/58 |
| 3,125,294 | 3/1964 | Lill | 47/9 X |
| 4,067,140 | 1/1978 | Thomas | 47/9 |

Primary Examiner—Robert E. Bagwill
Attorney, Agent, or Firm—Head & Johnson

[57] ABSTRACT

A method of starting rapid grass growth, including mixing dry adhesive and grass seed in a blender, subjecting the mixture to an electrostatic charge to cause the adhesive to cling to the seed, adding fertilizer to the seed and grass mixture, grinding cellulose material to chip it into small particles and simultaneously feeding into the grinder the adhesive, seed and fertilizer mixture, the heat of grinding serving to activate the adhesive to bind the materials to each other to form a grass starting composition, blowing the composition onto land to be planted, and watering the composition.

10 Claims, 2 Drawing Figures

METHOD OF RAPID GRASS GROWTH

BACKGROUND OF THE INVENTION

I. Field of the Invention

This invention relates to a method of starting rapid grass growth on land, and more particularly to a method of manufacturing a composition for starting grass growth. The composition includes dry adhesive, grass seed, fertilizer and cellulosic material. Rapid grass growth is started by spreading a composition of the material onto land to be planted followed by watering or simultaneously spraying and watering the material.

II. Description of the Prior Art

The common method of starting grass growth on land is to broadcast the seeds directly onto the land, which may first be prepared by plowing to loosen the soil, or seeds may be broadcast directly onto the land followed by raking to disturb the top surface of the soil and at least partially cover the seeds.

The problem with grass seed is most varieties must be planted on the surface or at very shallow depths below the surface. The seeds are therefore subject to being washed away by rain, blown away by wind and eaten by birds, insects and rodents. In order to protect the surface of planted areas others have suggested spraying or otherwise placing fibrous material on planted areas. Reference may be had to the following U.S. patents which disclose various binding and mulching methods and compositions; Nos. 2,789,399; 3,600,852; 3,805,447; 3,482,353; 3,867,250; 3,871,130; 3,936,976; 3,938,279; and 4,071,400.

While others have taught enhanced growth of grass by applying grass seeds with thatching, none have taught successfully a method of combining grass seed, fertilizer and thatching so that the components stay evenly mixed and are available for spraying on an area to be planted.

It is therefore an object of the present invention to provide an improved method of starting rapid grass growth.

This general object, as well as other and more specific objects of the invention will be fulfilled in the following description and claims, taken in conjunction with the attached drawings.

SUMMARY OF THE INVENTION

A method is described of manufacturing a composition for use in starting rapid grass growth, and, as an additional step, the application of the product onto the ground where grass is to be grown. In its simplest embodiment, the invention includes a new composition for use in starting grass growth. The method, which includes the production of the composition, includes mixing dry powdered adhesive and grass seed in a blender. During the mixing process the mixture of grass seed and dry adhesive is subjected to an electrostatic charge to cause the adhesive to cling to the seed. Fertilizer, preferably in the form of granulated prilled fertilizer, is added to and thoroughly mixed with the adhesive covered grass seed, the mixture then being a grass growth concentrate. Cellulosic material is chopped in a grinder or hammer mill to a preselected size. During the chopping operation the grass growth concentrate is added in a preselected ratio to the cellulosic material. The heat of the chopping operation causes the adhesive to activate sufficiently to bind the cellulosic material, the fertilizer, and the grass seed together sufficient that it remains evenly disbursed during storage and shipping, but nevertheless wherein the material is loose. The product is applied by spraying it onto land on which the grass is to be grown. This can be accomplished utilizing a blower such as the type utilized in applying loose insulation. The material may be blown into position on the ground and subsequently sprayed with water or, utilizing a special nozzle of a type available on the market, the loose material may be blown and simultaneously wetted as it is applied to the area where the grass is to be grown. The water dissolves the adhesive and binds the material together to form a thatch on the ground surface. The thatch is not easily displaced by wind or rain and yet is porous to permit water to pass therethrough into the earth below. The fertilizer causes the grass to grow rapidly after the seeds germinate. The cellulosic material holds the seeds in proper distribution and the deterioration of the cellulosic material, augmented by the presence of the fertilizer, aids in the growth of grass.

DETAILED DESCRIPTION

The drawings are diagramatic only and not intended to pictorially represent mechanical equipment used in the manufacture of the quick grass growth composition of this invention. All of the equipment necessary for practicing the methods of this invention are readily available on the market and therefore the invention is not directed to specific pieces of apparatus but is directed towards the sequence of steps, the composition of the materials employed, and the ratios of the materials which achieves the ultimate result.

Figure 1:
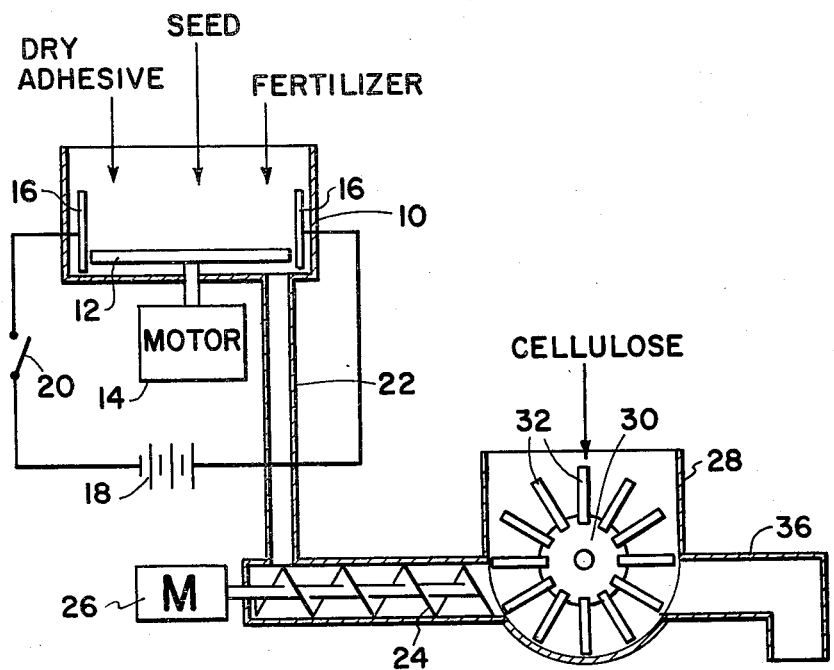
FIG. 1 shows diagramatically the steps employed in manufacturing a grass growth composition according to the method of this invention.

Referring first to FIG. 1 a tub-type blender indicated by the numeral 10, is utilized to produce a grass growth concentrate. The blender 10 includes stirring blades 12 rotated by a motor 14. In the practice of the method, dry adhesive and grass seeds are deposited into the blender 10 and thoroughly mixed by the rotating blades 12. For a given quantity of grass growth concentrate, approximately 10% is grass seed and approximately 25% dry adhesive. Seed may be any type of grass seed which is commonly employed today including bermuda, fescue, rye, etc. The adhesive is a dry powder type commonly utilized in industry today. A type of dry adhesive formed of a dextrine base which is water soluble or water activated is ideal. Such adhesives also are slightly activated by heat which is an important characteristic to be utilized in the process of this invention as will be explained later.

After the grass seed and dry adhesive are blended thoroughly together, which may take only a short time such as three minutes or so, an electrostatic charge is applied to the mixture. This may be accomplished in a variety of ways, such as by the use of insulated plates 16 having a voltage source 18 connected between them. Switch 20 is in series with the voltage source so that when it is closed an electrostatic charge is applied between the plates 16. Blending is continued while the electrostatic charge is applied, which requires only a very brief time, to cause the dry powder adhesive to adhere to the grass seed.

Next, solid fertilizer, preferably in the form of powder, granulated or prilled, is added to the seed and adhesive mixture at a ratio of about 65% of the grass growth concentrate. The fertilizer is preferably of the balance type such as 10-20-10 and can be specifically selected for the type of grass to be grown and the soil conditions where the composition is to be used.

The three blended materials, that is dry powder adhesive, grass seed and fertilizer, form a grass growth concentrate. This material is fed through conduit 22 to an auger 24 driven by a motor 26, into a chopper or hammer mill 28. The chopper includes a rotating head 30 having blades 32 affixed thereto which are normally pivoted to the head and extend rigidly outward because of the rapid rotation of head. Cellulosic material is fed into chopper 28. The cellulosic material may be any type of readily-available, inexpensive, biodegradable material such as paper, straw, sawdust, woodchips, bark chips, bagassee, grass, peat moss, leaves, etc. The chopper 28 is preferably of the type which will rapidly chop the cellulosic material into particles of about 0.5 centimeters or less.

Simultaneously with the chopping, auger 24 feeds the concentrate from conduit 22 into the chopper which serves not only to chop up the cellulose material but simultaneously blend with it the concentrate. In the process of chopping the cellulosic material into small particles, heat is generated. The adhesive material selected for use in the process is of the type which is slightly activated by heat which causes the concentrate to adhere to the cellulosic particles. The effect of heat on adhesive is sufficient only to cause the material to bind together enough that it does not become separate during subsequent handling, packaging and shipment, but the material is still loose enough so that it is the form of discrete particles.

The output from chopper 28 is deposited to a bagging operation 34 where the material is placed in bags for handling and shipment, or it can be deposited in bulk containers or directly into the bed of a truck for transportation.

The material emanating from discharge chute 36 of the chopper 28 is the finished rapid grass growth composition ready to be applied. The composition is preferably about one to three percent grass seed, about eight to twenty percent fertilizer, about three to eight percent dry power adhesive, and sixty-nine to eighty-eight percent cellulose. A typical blend forming one hundred pounds of the material includes about two pounds of grass seed, thirteen pounds of fertilizer, five pounds of dry powder adhesive and eighty pounds of cellulose.

Figure 2:
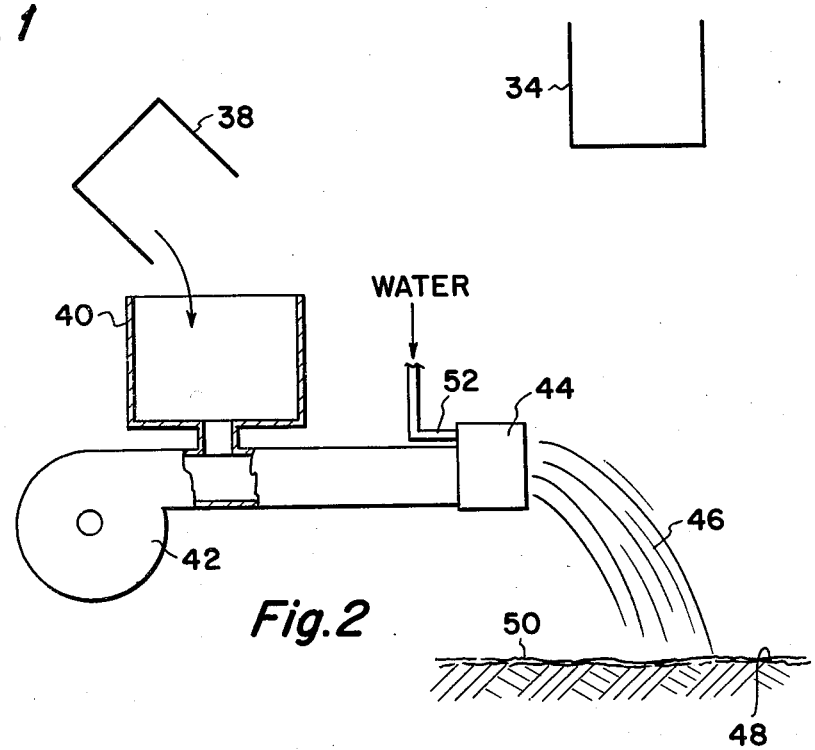
FIG. 2 shows diagramatically a method of distributing the grass growth composition onto an area where grass is to be grown.

Referring to FIG. 2 the method of applying the rapid grass growing composition is illustrated. The composition, which may be transported such as in the form of a bag 38, is deposited into a hopper 40. A blower 42 moves the rapid grass growth composition through a nozzle 44. Workmen can direct the nozzle to apply the grass growth composition by the flow of air, illustrated by numeral 46, onto the earth where grass is to be grown. There are two ways the material can be employed. First it can be blown directly onto the earth 48 followed by thoroughly watering the layer of grass growth formed on the earth. Second, a distribution system may be utilized which employs water directly into the air-blown composition 46. In this method, water is applied through a conduit 52 directly into the nozzle 44 so that the airblown composition 46 is wet as it impinges upon the earth 48. In either method the composition forms a crust 50 on the earth. The water activates the adhesive and securely binds the four ingredients together. While the ingredients are secured to each other the crust remains porous so the water can seep downwardly into the earth below. The crust formed by the composition is not easily displaced by wind or rain. Because of the thorough blending employed in the process the grass seed, fertilizer and cellulosic material are all evenly distributed.

Subsequent to the application of the crust of grass growth composition 50 on the earth it is periodically thereafter watered by direct spraying from a hose or from a watering system. The grass seeds, protected by the cellulosic material, quickly germinate. After germination the grass plants are supplied nutrients from the fertilizer which is dissolved into the soil by the watering process. Simultaneously the cellulosic material begins to decompose to supply organic material. After the seeds germinate the small plants are held in place and supported by the composition while they firmly root. As the grass plants grow the cellulosic material continues to decompose and the fertilizer continues to dissolve to add necessary nutrients.

Thus it can be seen that the rapid grass growth composition provides a unique and highly improved method of rapidly starting grass for areas such as lawns, golf courses, parks, and is, in addition, useful for growth of grass for agricultural purposes.

While the invention has been described with a certain degree of particularity it is manifest that many changes may be made in the steps employed in practicing the invention without departing from the spirit and scope of this disclosure. It is understood that the invention is not limited to the embodiment set forth herein but is to be limited only by the scope of the attached claim or claims, including the full range of equivalency to which each element or step thereof is entitled.

What is claimed is:

1. A composition for use in starting grass growth comprising a thoroughly blended mixture of dry adhesive grass seed, fertilizer and chopped cellulose, the proportion of each being selected to maximize the rate of grass growth according to the type of seed and the soil conditions in the geographical area where the composition is to be used.

2. A composition according to claim 1 wherein the composition has, by weight, 3 to 8% dry adhesive, 1 to 3% grass seed, 8 to 20% fertilizer and 69 to 88% cellulose.

3. A composition according to claim 1 wherein the cellulosic material is selected from the group comprising paper, straw, sawdust, wood chips, bark chips, bagasse, grass, peat moss and leaves and wherein the cellulosic material is chopped into particles of about 0.5 centimeters and less.

4. A method of manufacturing a composition for use starting grass growth comprising:
   (a) mixing dry adhesive and grass seed in a blender;
   (b) subjecting the mixture of seed and adhesive to an electrostatic charge to cause the adhesive to cling to the seed;
   (c) adding fertilizer to the seed and grass mixture to form a grass growth concentrate;
   (d) chopping cellulosic material into small particles and simultaneously feeding into the chopper a selected proportion of the grass growth concentrate from step (c) the heat of chopping serving to bind the grass growth concentrate to the cellulose so that the concentrate remains evenly dispersed during storage and shipping.

5. The method according to claim 4 wherein the completed mixture has by weight, 3 to 8% dry adhesive, 1 to 3% grass seed, 8 to 20% fertilizer, and 69 to 88% cellulose.

6. The method according to claim 4 wherein in step (d) the cellulosic material is selected from the group comprising paper, straw, sawdust, wood chips, bark chips, bagasse, grass, peat moss and leaves and wherein the cellulosic material is chopped into particles of about 0.5 centimeters and less.

7. The method of starting grass growth on land comprising:
   (a) mixing dry adhesive and grass seed in a blender;
   (b) subjecting the mixture of seed and adhesive to an electrostatic charge to cause the adhesive to cling to the seed;
   (c) adding fertilizer to the seed and grass mixture to form a grass growth concentrate;
   (d) chopping cellulosic material into small particles and simultaneously feeding into the chopper a selected proportion of the grass growth concentrate from step (c) the heat of chopping serving to bind the grass growth concentrate to the chopped cellulose to form a grass growth composition which remains evenly dispersed;
   (e) blowing the grass growing composition onto the land to be planted; and
   (f) watering the composition.

8. The method according to claim 7 wherein steps (e) and (f) are combined by blowing the composition onto land and simultaneously mixing water with the composition.

9. The method according to claim 7 wherein the composition has, by weight, 3 to 8% dry adhesive, 1 to 3% grass seed, 8 to 20% fertilizer and 69 to 88% cellulosic material.

10. The method according to claim 7 wherein in step (d) the cellulosic material is selected from the group comprising paper, straw, sawdust, wood chips, bark chips, bagasse, grass, peat moss and leaves and wherein the cellulosic material is chopped into particles of about 0.5 centimeters and less.

* * * * *